United States Patent
Miller et al.

(10) Patent No.: US 7,229,064 B2
(45) Date of Patent: Jun. 12, 2007

(54) VALVE FOR CONTROLLING A FLUID

(75) Inventors: Frank Miller, Ilsfeld (DE); Elmar Okrent, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 51 days.

(21) Appl. No.: 10/531,212

(22) PCT Filed: Oct. 22, 2004

(86) PCT No.: PCT/EP2004/052636

§ 371 (c)(1),
(2), (4) Date: Apr. 12, 2005

(87) PCT Pub. No.: WO2005/043017

PCT Pub. Date: May 12, 2005

(65) Prior Publication Data

US 2005/0258385 A1    Nov. 24, 2005

(30) Foreign Application Priority Data

Nov. 3, 2003 (DE) ................................ 103 51 207

(51) Int. Cl.
*F16K 31/06*    (2006.01)

(52) U.S. Cl. ................................................. 251/129.21
(58) Field of Classification Search ............ 251/129.21
See application file for complete search history.

(56) References Cited

U.S. PATENT DOCUMENTS

| | | | |
|---|---|---|---|
| 4,331,317 A | 5/1982 | Nishioka et al. |
| 4,621,788 A | 11/1986 | Ostrowski et al. |
| 5,197,672 A | 3/1993 | Rudolf et al. |
| 5,232,167 A | 8/1993 | McCormick et al. |
| 6,089,467 A | 7/2000 | Fochtman et al. |
| 6,422,488 B1 | 7/2002 | Cohen et al. |

FOREIGN PATENT DOCUMENTS

| | | |
|---|---|---|
| DE | 195 03 736 | 8/1996 |
| EP | 0 661 444 | 7/1995 |

*Primary Examiner*—J. Casimer Jacyna
(74) *Attorney, Agent, or Firm*—Kenyon & Kenyon LLP

(57) ABSTRACT

A valve for controlling a fluid, in particular for controlling a gas. The valve includes a valve housing having a housing sleeve and an electromagnetic actuator for an armature which is guided in an axially displaceable manner and which cooperates with a valve seat situated on a seating plate so that a fluid flow through outflow orifices in the seating plate is controllable. The armature is guided along an armature sleeve which is situated in the housing sleeve.

8 Claims, 5 Drawing Sheets

VALVE FOR CONTROLLING A FLUID

FIELD OF THE INVENTION

The present invention is directed to a valve for controlling a fluid, in particular for controlling a gas.

BACKGROUND INFORMATION

A valve is known from practice and is usable, for example, as a gas control valve in a fuel cell or also in a gas-powered engine.

The known valve includes a valve housing which accommodates an in particular electromagnetic actuator for an armature and is provided with a housing sleeve in which the armature is guided in an axially displaceable manner. The armature is used as a valve-closing element and cooperates with a valve seat situated on a seating plate so that a fluid flow through outflow orifices in the seating plate is controllable.

The problem in the case of the known gas valve is that the dry and gaseous medium to be controlled results in high wear demands which necessitate high-precision guiding of the armature. This cannot be reliably ensured by the previously used guiding of the armature in the housing sleeve since the housing sleeve may have the problem of concentricity variations and diameter tolerances resulting from the deep-drawing processes used in the manufacture. The eccentricities and the diameter variations increase the tilting tendency of the armature and may in turn shorten the valve's service life.

SUMMARY OF THE INVENTION

The valve according to the present invention for controlling a fluid, in particular for controlling a gas, in which the armature is guided along an armature sleeve which is situated in the housing sleeve, has the advantage that the armature sleeve is manufacturable in a simple and cost-effective manner to have a uniform interior diameter and thus good concentricity properties which have an advantageous effect on the valve's continuous operation properties. Due to the use of the armature sleeve, an additional guide sleeve is present which ensures optimized guide conditions and thus only a slight tilting tendency of the armature and therefore little wear in the guide area of the armature and also in the valve seat area.

Moreover, the uniform interior diameter of the armature sleeve makes it possible that, for producing an exterior diameter corresponding to the armature sleeve, the armature may be machined using a simple serial process, such as a continuous grinding process, since only one guide diameter in particular is necessary on the armature.

The armature sleeve is integratable into the known valve in a simple manner so that it is also integratable into the housing sleeve in existing series manufacturing processes without great expense.

The valve according to the present invention is particularly suitable for the mass flow regulation of gases such as hydrogen and natural gas and may be used, for example, in a fuel cell or also in a gas-powered engine.

In a specific embodiment of the valve according to the present invention, the armature sleeve is connected to the seating plate via a press-fit connection. A seating plate which essentially corresponds to a previously used seating plate and may be redesigned for connecting the armature involving minor expenses may be used in this case in particular.

Alternatively or also for further securing of the armature sleeve, it may be welded to the seating plate. It is also conceivable that the armature sleeve is connected to the seating plate via bonding or via flanging.

In an alternative embodiment of the valve according to the present invention, the armature sleeve and the seating plate are manufactured as one piece and designed as a deep-draw part in particular. The armature sleeve and possibly the seating plate may also be designed as a turned part, an MIM (metal injection molding) part, an extrusion part, or the like.

The valve according to the present invention may be tested for leaks directly at a functional group including the armature sleeve, the seating plate and the armature. In the case of the above-described known valve, a test for leaks may only be performed when the assembly made up of the armature and the seating plate is integrated into the housing sleeve or the valve housing.

The armature may be guided in the armature sleeve via at least one guide collar, preferably via two guide collars of the armature. For optimizing a magnetic flow, the armature may also have a guide area which extends in the axial direction of the armature over a wide area and rests essentially entirely against the interior wall of the armature.

For optimizing the magnetic flow further, the armature may be designed in such a way that an area having an enlarged diameter is situated outside the armature sleeve. In this case, the area having an enlarged diameter adjoins, possibly via an annular gap, the housing sleeve which is enclosed by the magnetic actuator. It is also conceivable that the area of the armature having an enlarged diameter is guided on the housing sleeve.

DETAILED DESCRIPTION

Figure 1:
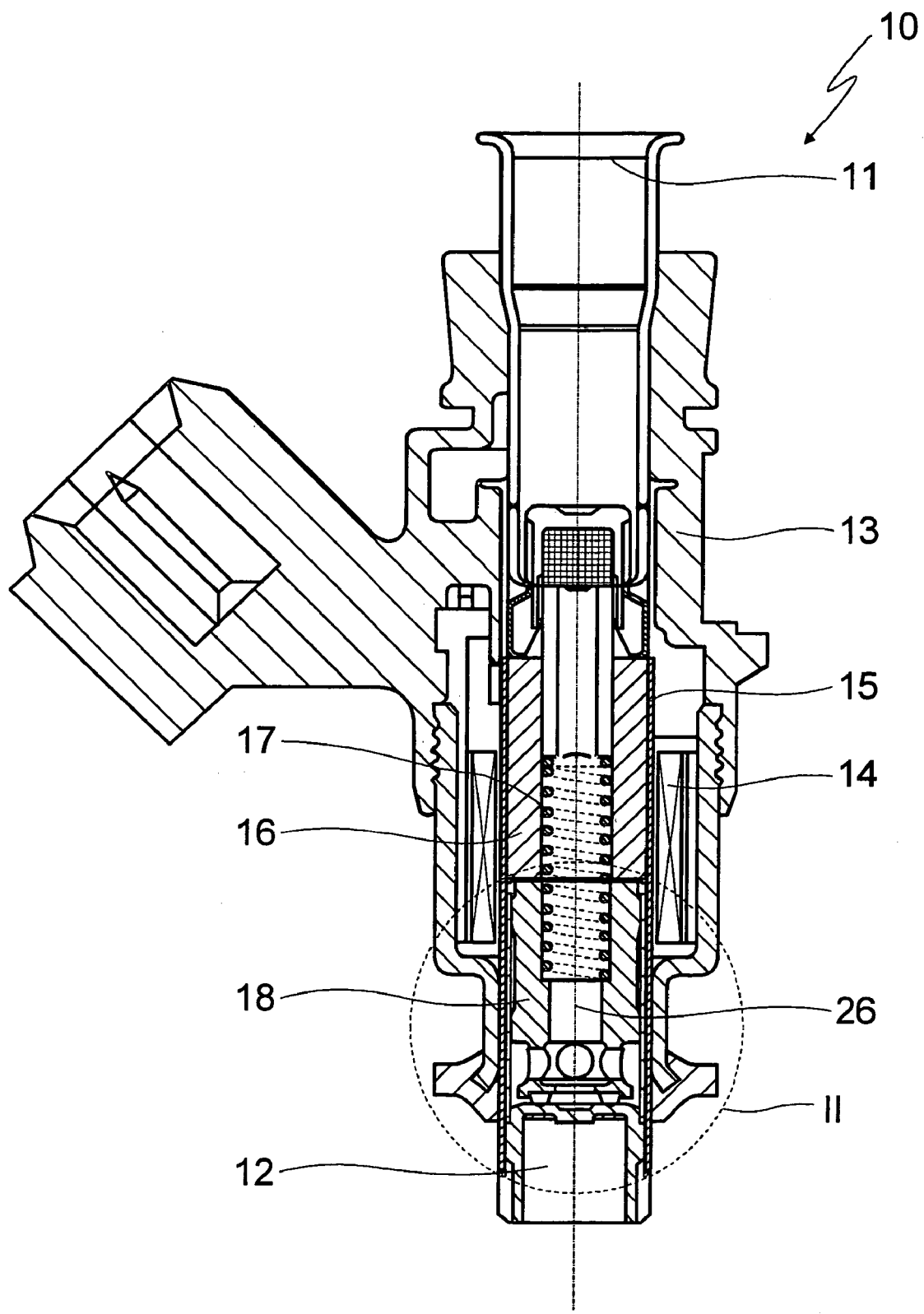
FIG. 1 shows a longitudinal section of a first embodiment of a gas valve.

FIG. 1 shows a gas valve 10 which is designed for integration into a fuel cell or into a gas-powered engine and which is used for regulating a hydrogen flow or an NG (natural gas) flow from an inflow side 11 to an outflow side 12.

Gas valve 10 includes a multi-part housing 13 which accommodates a magnetic coil 14 and a housing sleeve 15.

An essentially tubular plug 16 is fixed in housing sleeve 15, a helical spring 17, used as a pre-stressing spring, being inserted into the plug, and the helical spring acting on an armature 18 which is situated in housing sleeve 15 in a longitudinally displaceable manner.

Figure 2:
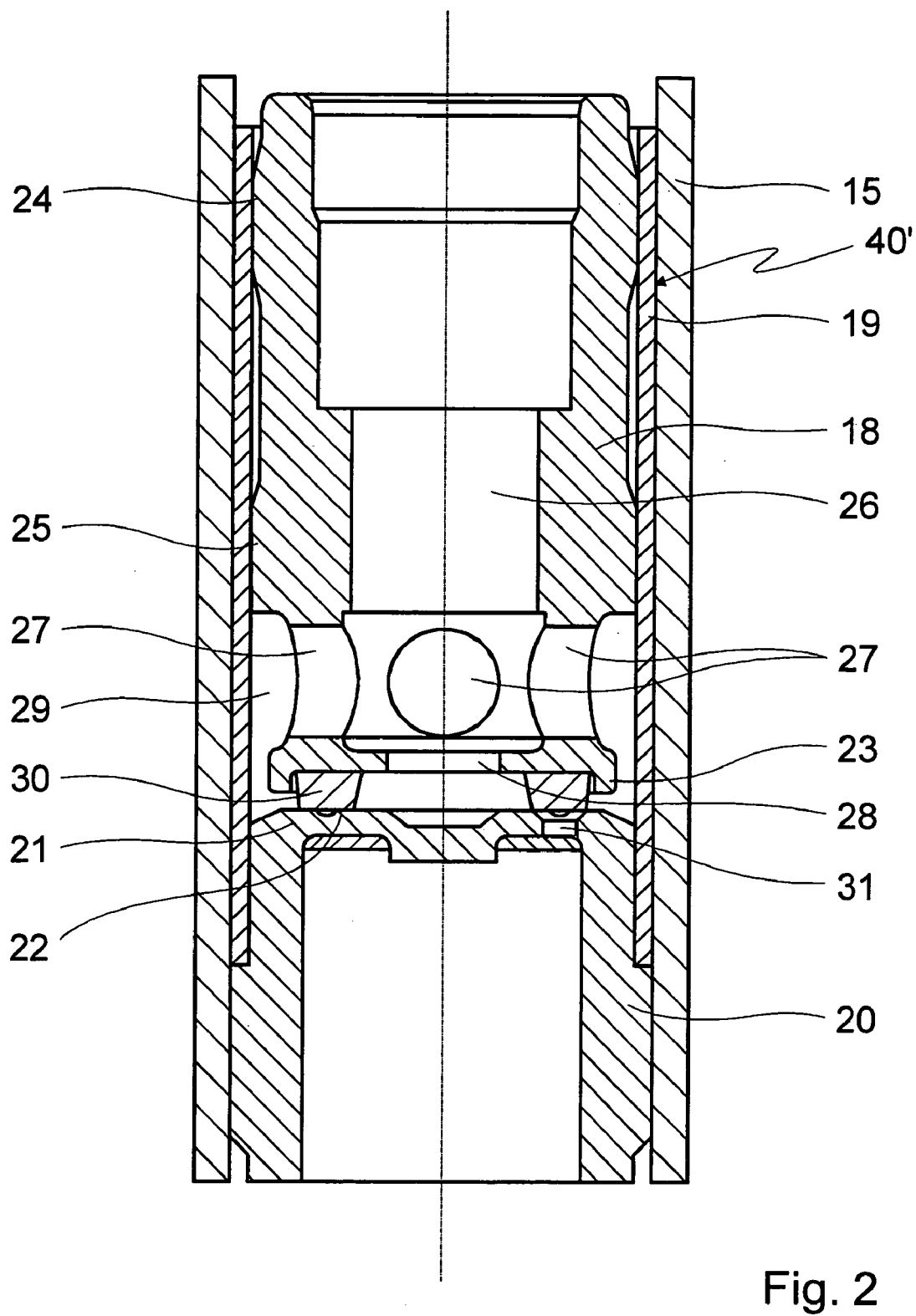
FIG. 2 shows an enlarged representation of area II in FIG. 1.

As FIG. 2 particularly shows, armature 18 is guided along an armature sleeve 19 which is clamped onto a cup-shaped component 20 the bottom area of which forms a seating plate 21 on which a valve seat 22 is situated for a front area 23 of armature 18 used as a valve-closing element. For securing purposes, armature sleeve 19 is welded to cup-shaped component 20 which is pressed into housing sleeve 15. Armature sleeve 19, armature 18, and seating plate 21 form functional group 40.

For guidance in armature sleeve 19, armature 18 has two guide collars 24 and 25 on its circumference which are machined using a continuous grinding process to produce the exterior diameter corresponding to the interior diameter of armature sleeve 19.

Armature 18, having an essentially tubular design, has an internal space 26, connected to inflow side 11 of valve 10, and from which radial outflow bore holes 27 and an axial outflow bore hole 28 branch off. Radial outflow bore holes 27 lead to a high-pressure space 29 which is bordered by armature 18 and armature sleeve 19. Axial outflow bore hole 28 leads to the front face of armature 18.

Furthermore, a sealing ring 30, made of an elastomer, is situated on the front face of front area 23 of armature 18 designed as a valve-closing element, the sealing ring cooperating with valve seat 22 in such a way that a fluid flow through outflow orifices or jets 31 is controllable, the outflow orifices being situated along a circular curve in seating plate 21 of cup-shaped component 20 and leading to outflow side 12 of gas valve 10.

Figure 3:
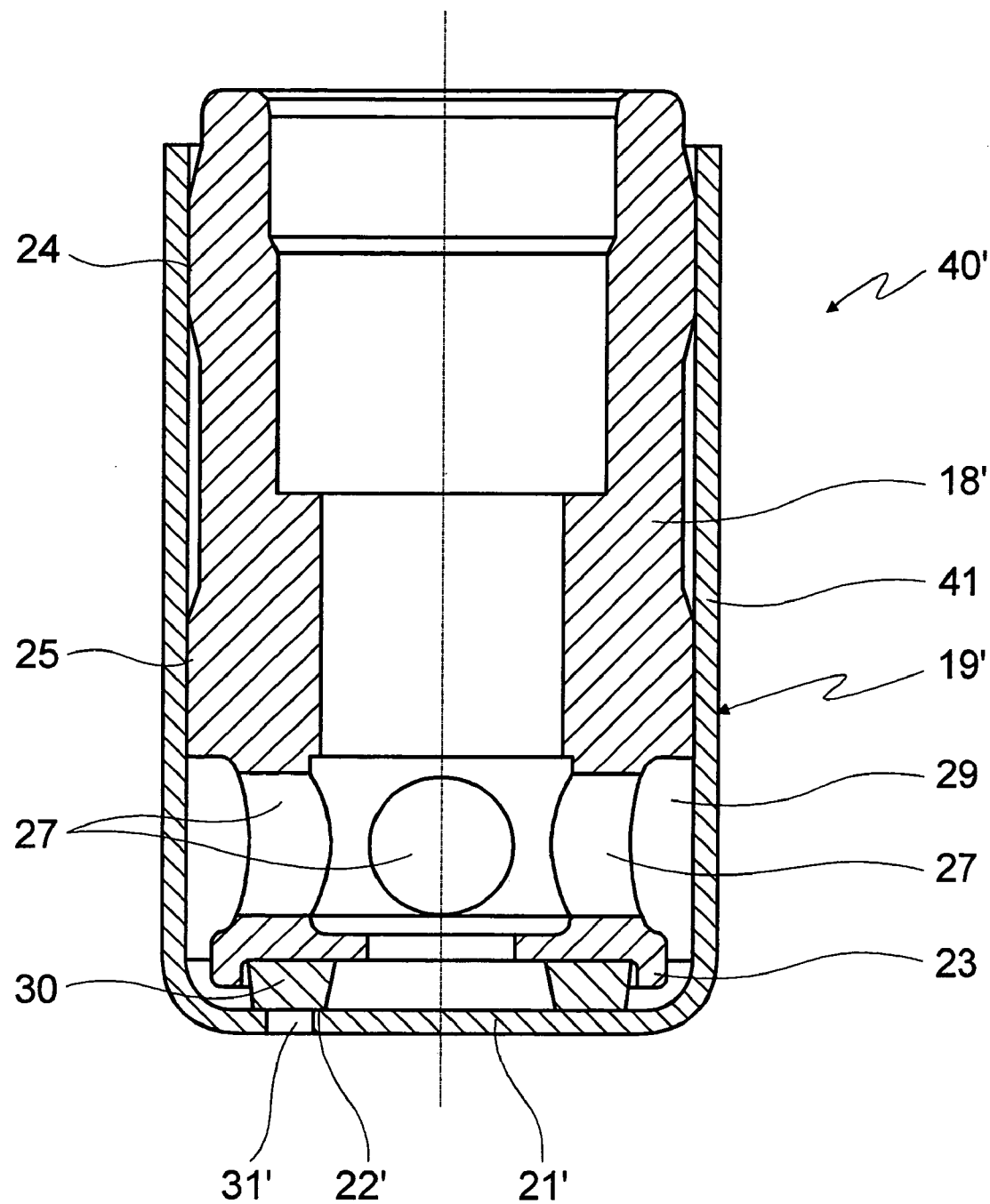
FIG. 3 shows a functional group, including an armature and a cup-shaped armature sleeve, of a second embodiment of a gas valve.
Figure 4:
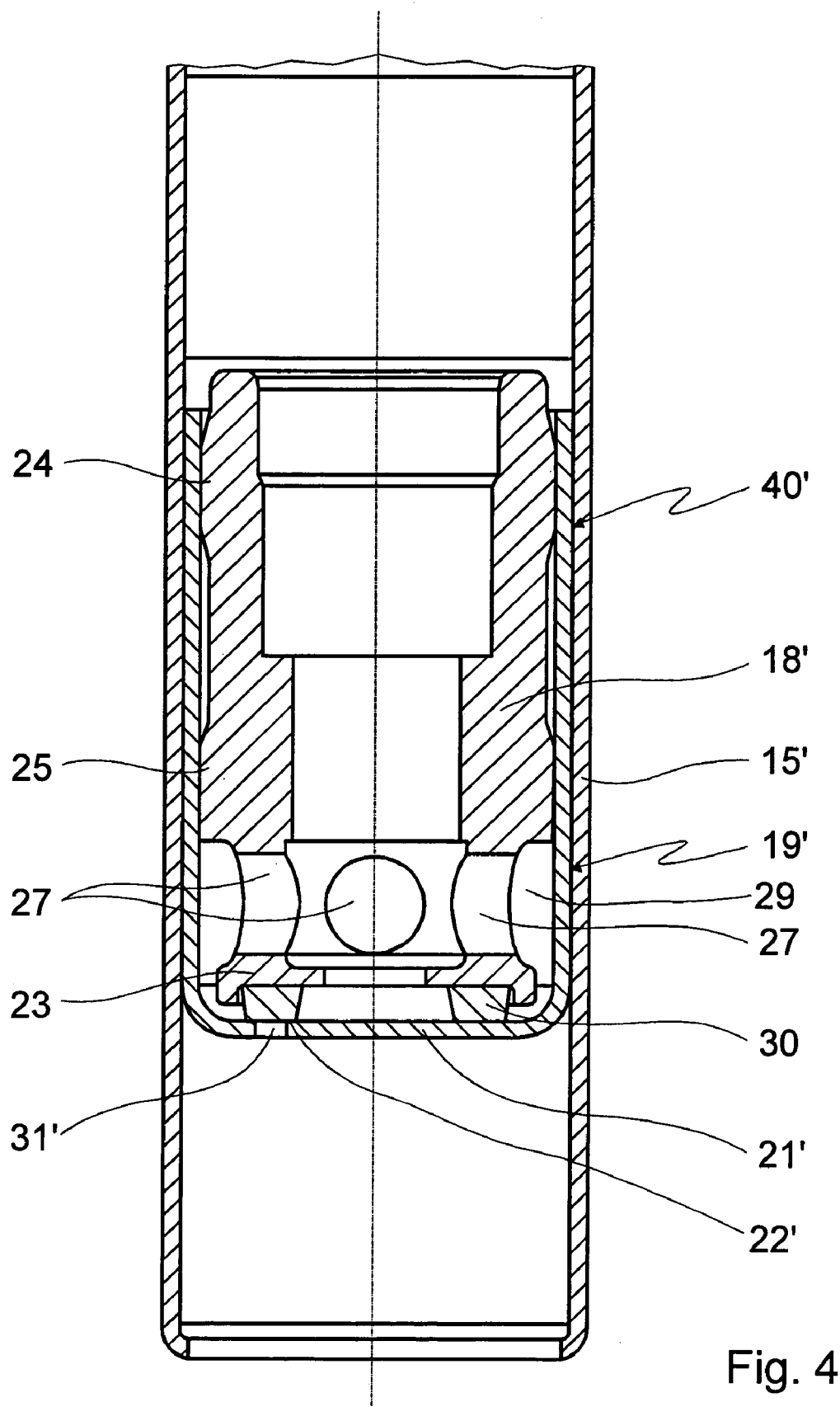
FIG. 4 shows the functional group according to FIG. 3 in a housing sleeve.

FIGS. 3 and 4 show an alternative embodiment of a functional group 40', which is made up of an armature 18' and an armature sleeve 19' and is used for integration into a housing sleeve 15' of a gas valve of the type illustrated in FIG. 1.

The configuration of armature 18' corresponds to the configuration of the armature shown in detail in FIG. 2. However, armature sleeve 19' is configured in such a way that it is made up of a cylindrical wall area 41, along which armature 18' is guided via its guide collars 24 and 25, and a bottom area 21' used as a seating plate, which has a valve seat 22' for applying a seal 30 situated on the front face of armature 18', and in which outflow orifices or jets 31' are situated which lead to the outflow side of the gas valve (not shown in detail).

Outflow jets 31' are introduced into seating plate 21' via a punching process, a laser boring process, or the like.

Armature sleeve 19' having seating plate 21' forms a deep-draw part in which valve seat 22' may be tested for leaks already at functional group 40' shown in FIG. 3 and in which the guide for armature 18' and valve seat 22' are manufacturable with optimized shape and position tolerances. Seal 30 and valve seat 22' thus have an optimum position with respect to one another which ensures great tightness of valve seat 22'.

Furthermore, for securing armature sleeve 19' in housing sleeve 15', armature sleeve 19' is welded to housing sleeve 15'.

Figure 5:
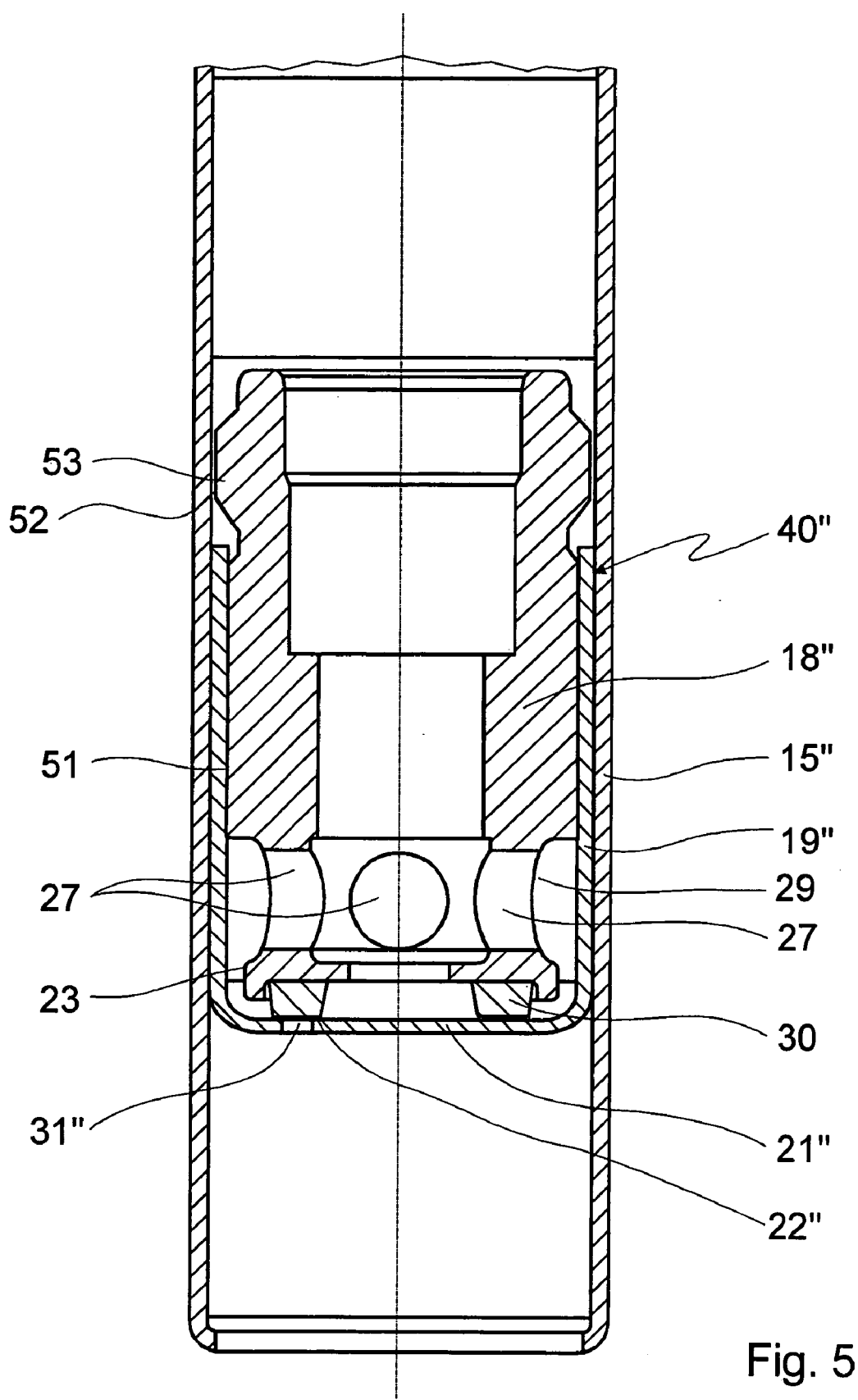
FIG. 5 shows a functional group including an armature and an armature sleeve corresponding to the representation in FIG. 4, the armature, however, having an area with an enlarged diameter outside the armature sleeve.

FIG. 5 shows a third embodiment of a functional group 40" for integration into a housing sleeve 15" of a gas valve of the type illustrated in detail in FIG. 1. Functional group 40" largely corresponds to functional group 40' shown in FIGS. 3 and 4 but differs in that it has an armature 18" which is guided over a long guiding surface 51 in an armature sleeve 19" which, similarly to the embodiment according to FIGS. 3 and 4, represents a deep-draw part, manufactured in one piece together with a seating plate 21", a valve seat 22" as well as outflow jets 31" being situated in the seating plate. Valve seat 22" cooperates with a seal 30 situated on the front face of armature 18".

Armature 18" includes an area 52 having an enlarged diameter which is formed on the side facing away from seal 30 and which is situated outside armature sleeve 19". Area 52 having an enlarged diameter borders on housing sleeve 15" via a narrow annular gap 53 and is thus not guided along the housing sleeve.

An armature of the type shown in FIG. 5 may alternatively be guided in an armature sleeve which, corresponding to the embodiment according to FIG. 2, is connected to a seating plate via a press-fit seat, the valve seat being situated on the seating plate which is provided with outflow jets.

What is claimed is:

1. A valve for controlling a fluid, comprising:
   a valve housing having a housing sleeve;
   a seating plate;
   a valve seat situated on the seating plate;
   an armature;
   an electromagnetic actuator for the armature which is guided in an axially displaceable manner and which cooperates with the valve seat situated on the seating plate so that a fluid flow through outflow orifices in the seating plate is controllable;
   an armature sleeve situated in the housing sleeve, the armature being guided along the armature sleeve; and
   an annular sealing element provided on the armature which cooperates with the seating plate to form a sealing seat, a plurality of the outflow orifices in the seating plate being closed via the sealing element when the valve is closed.

2. The valve according to claim 1, wherein the fluid is a gas.

3. The valve according to claim 1, wherein the armature sleeve is connected to the seating plate via a press-fit connection.

4. The valve according to claim 1, wherein the armature sleeve is welded to the seating plate.

5. The valve according to claim 1, wherein the armature sleeve is manufactured in one piece together with the seating plate and forms a deep-draw part.

6. The valve according to claim 1, further comprising at least one guide collar for guiding the armature in the armature sleeve.

7. The valve according to claim 1, wherein an area of the armature having an enlarged diameter is situated outside the armature sleeve.

8. The valve according to claim 7, wherein the area having an enlarged diameter is guided along the housing sleeve.

* * * * *